(12) United States Patent
Muller (10) Patent No.: US 10,839,036 B2
(45) Date of Patent: *Nov. 17, 2020

(54) WEB BROWSER HAVING IMPROVED NAVIGATIONAL FUNCTIONALITY

(71) Applicant: INTERNATIONAL BUSINESS MACHINES CORPORATION, Armonk, NY (US)

(72) Inventor: Michael Muller, Medford, MA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/676,608

(22) Filed: Nov. 7, 2019

(65) Prior Publication Data
US 2020/0073898 A1 Mar. 5, 2020

Related U.S. Application Data

(63) Continuation of application No. 15/054,586, filed on Feb. 26, 2016, now Pat. No. 10,546,036.

(51) Int. Cl.
*G06F 3/0482* (2013.01)
*G06F 16/955* (2019.01)
(Continued)

(52) U.S. Cl.
CPC .......... *G06F 16/955* (2019.01); *G06F 16/954* (2019.01); *G06F 16/9535* (2019.01)

(58) Field of Classification Search
CPC .............. G06F 3/0482; G06F 3/04817; G06F 17/30876
See application file for complete search history.

(56) References Cited

U.S. PATENT DOCUMENTS 6,182,097 B1 * 1/2001 Hansen ................. G06F 11/323
707/999.003
6,667,751 B1 12/2003 Wynn et al.
(Continued)

OTHER PUBLICATIONS

Greenberg et al. "Getting Back to Back: Alternate Behaviors for a Web Browser's Back Button", Greenberg and Cockburn, Mar. 1999; CiteSeer, 7 pgs.
(Continued)

*Primary Examiner* — Phenuel S Salomon
(74) *Attorney, Agent, or Firm* — Cantor Colburn LLP; Anthony Curro (57) ABSTRACT

Embodiments include method, systems and computer program for providing improved navigational functionality in a web browser. Aspects include storing a browsing history comprising a sequence of websites and webpages visited by the web browser and providing a graphical user interface (GUI) configured to control a traversal of the browsing history by the web browser. Based on receiving a previous webpage command from the GUI, aspects include returning the web browser to a most recently visited webpage from the browsing history. Based on receiving a previous website command from the GUI, aspects include returning the web browser to a most recently visited website from the browsing history. The most recently visited website is associated with a different domain name than a currently displayed webpage.

20 Claims, 6 Drawing Sheets

(51) Int. Cl.
*G06F 16/954* (2019.01)
*G06F 16/9535* (2019.01)

(56) References Cited

U.S. PATENT DOCUMENTS

| | | | |
|---|---|---|---|
| 6,810,395 B1* | 10/2004 | Bharat | G06F 16/9562 |
| 7,343,554 B2 | 3/2008 | Waldorf et al. | |
| 7,403,938 B2* | 7/2008 | Harrison | G06F 16/3334 |
| 7,552,394 B2 | 6/2009 | Peterkofsky et al. | |
| 7,698,327 B2 | 4/2010 | Kapur | |
| 7,802,262 B1 | 9/2010 | Lynch et al. | |
| 7,810,035 B2 | 10/2010 | Dominowska et al. | |
| 8,015,170 B2* | 9/2011 | Badros | A61N 1/36003 |
| | | | 707/706 |
| 8,224,823 B1 | 7/2012 | Amacker | |
| 8,234,657 B1 | 7/2012 | Lynch et al. | |
| 8,281,259 B2 | 10/2012 | Milic-Frayling et al. | |
| 8,407,574 B2* | 3/2013 | Forstall | G06F 16/957 |
| | | | 715/200 |
| 8,433,996 B2* | 4/2013 | Paulsami | G06F 16/955 |
| | | | 715/206 |
| 8,667,421 B2 | 3/2014 | Grunberger | |
| 9,134,884 B2 | 9/2015 | Baird-Smith | |
| 9,262,646 B1* | 2/2016 | Yeo | G06F 21/6227 |
| 9,286,407 B2* | 3/2016 | Curwen | G06F 16/9562 |
| 2003/0112271 A1* | 6/2003 | Batalden | G06F 16/9577 |
| | | | 715/744 |
| 2003/0231216 A1 | 12/2003 | McBrearty et al. | |
| 2004/0139143 A1* | 7/2004 | Canakapalli | G06F 16/957 |
| | | | 709/200 |
| 2005/0076003 A1* | 4/2005 | DuBose | G06F 16/9535 |
| 2006/0224960 A1 | 10/2006 | Baird-Smith | |
| 2007/0038756 A1 | 2/2007 | Waldorf et al. | |
| 2007/0266342 A1* | 11/2007 | Chang | G06F 16/9535 |
| | | | 715/810 |
| 2009/0132907 A1* | 5/2009 | Shao | G06F 40/14 |
| | | | 715/234 |
| 2009/0171930 A1* | 7/2009 | Vaughan | G06F 16/955 |
| 2009/0327913 A1 | 12/2009 | Adar et al. | |
| 2010/0005053 A1 | 1/2010 | Estes | |
| 2010/0169802 A1* | 7/2010 | Goldstein | G06F 16/958 |
| | | | 715/760 |
| 2010/0306665 A1 | 12/2010 | Milic-Frayling et al. | |
| 2012/0131441 A1 | 5/2012 | Jitkoff et al. | |
| 2013/0061159 A1 | 3/2013 | Tseng et al. | |
| 2014/0095326 A1 | 4/2014 | Adam | |
| 2014/0282118 A1* | 9/2014 | Kumamoto | G06F 16/95 |
| | | | 715/760 |
| 2017/0249395 A1 | 8/2017 | Muller | |

OTHER PUBLICATIONS

List of IBM Patents or Patent Applications Treated as Related; (Appendix P), Date Filed Nov. 7, 2019; 2 pages.

\* cited by examiner

WEB BROWSER HAVING IMPROVED NAVIGATIONAL FUNCTIONALITY

DOMESTIC PRIORITY

This application is a continuation of U.S. patent application Ser. No. 15/054,586 titled "WEB BROWSER HAVING IMPROVED NAVIGATIONAL FUNCTIONALITY," filed on Feb. 26, 2016, the contents of which are incorporated herein by reference in its entirety.

BACKGROUND

The present disclosure relates to web browsers and more specifically, to methods, systems, and computer program products for providing improved navigational functionality in a web browser.

Web browsers are used by individuals to browse the Internet, or an organization's Intranet, on their desktops, smartphones, tablets and other computing devices. Currently available web browsers, provide an address bar, a forward button, a back button and a home button for users to navigate the Internet. The basic functionality and design of web browsers have remained largely unchanged for several years. A typical user begins a web browsing session by going to a search engine and searching for a desired topic. Once the results are returned, the user navigates through the results and the websites linked to by these results.

SUMMARY

In accordance with an embodiment, a method for providing improved navigational functionality in a web browser is provided. The method includes storing a browsing history comprising a sequence of websites and webpages visited by the web browser and providing a graphical user interface (GUI) configured to control a traversal of the browsing history by the web browser. Based on receiving a previous webpage command from the GUI, the method includes returning the web browser to a most recently visited webpage from the browsing history. Based on receiving a previous website command from the GUI, the method includes returning the web browser to a most recently visited website from the browsing history. The most recently visited website is associated with a different domain name than a currently displayed webpage.

In accordance with another embodiment, a web browser having improved navigational functionality is provided. The processor is configured to store a browsing history comprising a sequence of websites and webpages visited by the web browser and provide a graphical user interface (GUI) configured to control a traversal of the browsing history by the web browser. Based on receiving a previous webpage command from the GUI, the processor is configured to return the web browser to a most recently visited webpage from the browsing history. Based on receiving a previous website command from the GUI, the processor is configured to return the web browser to a most recently visited website from the browsing history. The most recently visited website is associated with a different domain name than a currently displayed webpage.

In accordance with a further embodiment, a computer program product for providing improved navigational functionality in a web browser includes a non-transitory storage medium readable by a processing circuit and storing instructions for execution by the processing circuit for performing a method. The method includes storing a browsing history comprising a sequence of websites and webpages visited by the web browser and providing a graphical user interface (GUI) configured to control a traversal of the browsing history by the web browser. Based on receiving a previous webpage command from the GUI, the method includes returning the web browser to a most recently visited webpage from the browsing history. Based on receiving a previous website command from the GUI, the method includes returning the web browser to a most recently visited website from the browsing history. The most recently visited website is associated with a different domain name than a currently displayed webpage.

BRIEF DESCRIPTION OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

DETAILED DESCRIPTION

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 1:
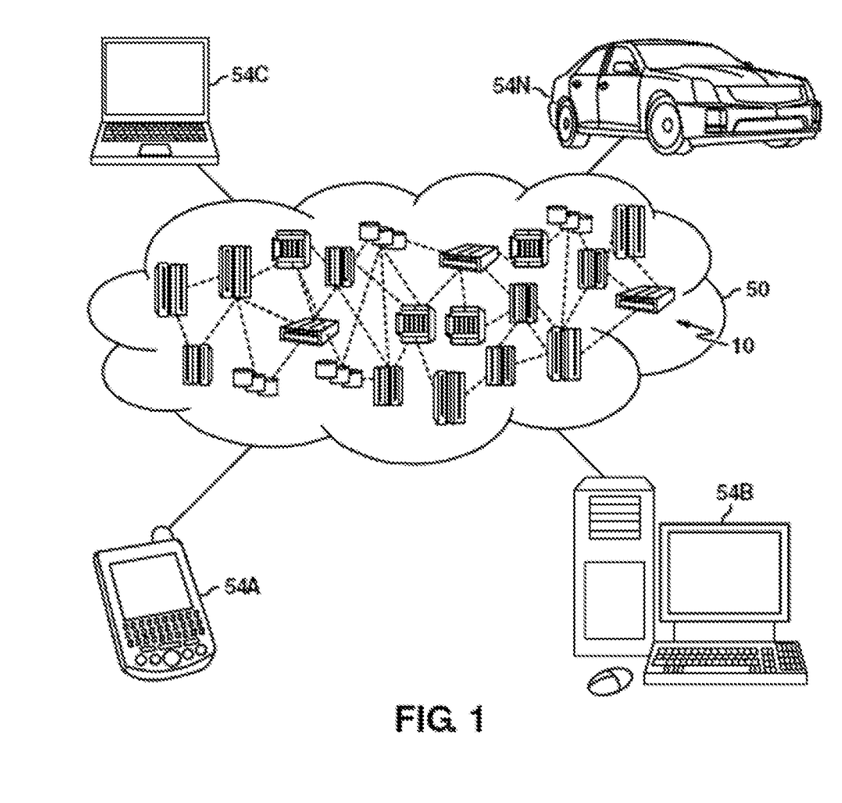
FIG. 1 depicts a cloud computing environment according to an embodiment of the present invention.

Referring now to FIG. 1, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
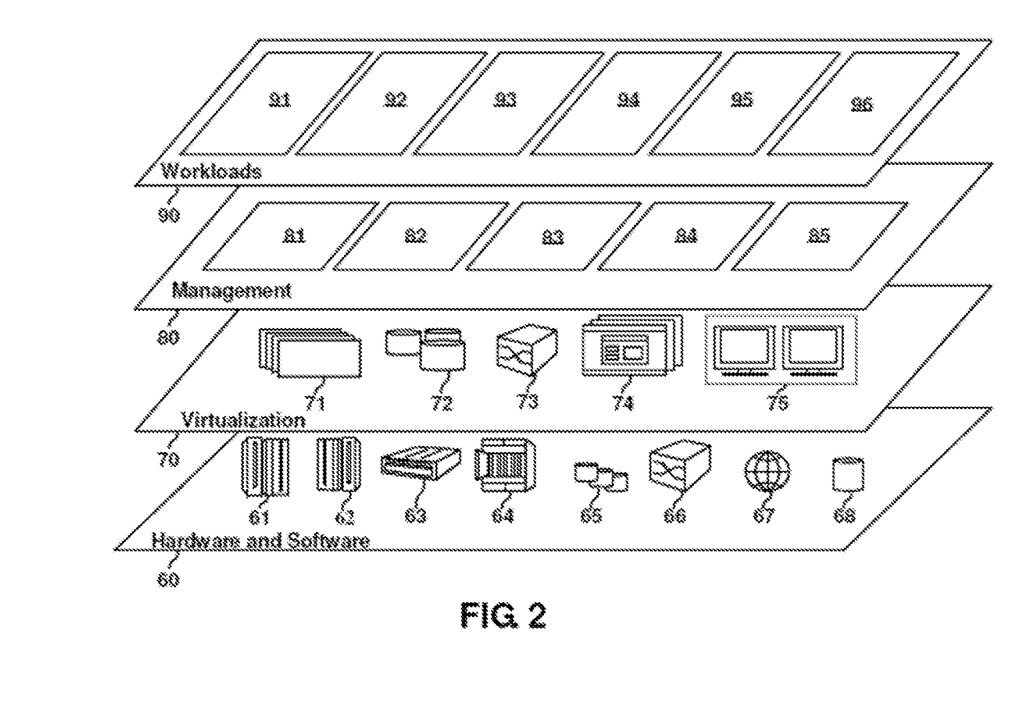
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provides pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and web browsing 96.

In exemplary embodiments, methods, systems, and computer program products for providing improved navigational functionality in a web browser are provided. In general, web browsers include an address bar, a forward button, a back button and a home button that are used to navigate the Internet. In exemplary embodiments, a web browser is provided that includes improved navigational functionality in the form of one or more additional navigational options. In exemplary embodiments, the web browser is configured to allow a user to not only select to return to a previous page but also to allow a user to return to a previous website, a previous search page or to a previous web browsing session. In exemplary embodiments, these functions can be provided by separate graphical user interface icons, i.e., buttons, or these function can be provided by detecting specific user actions with existing graphical user interface icons.

Figure 3:
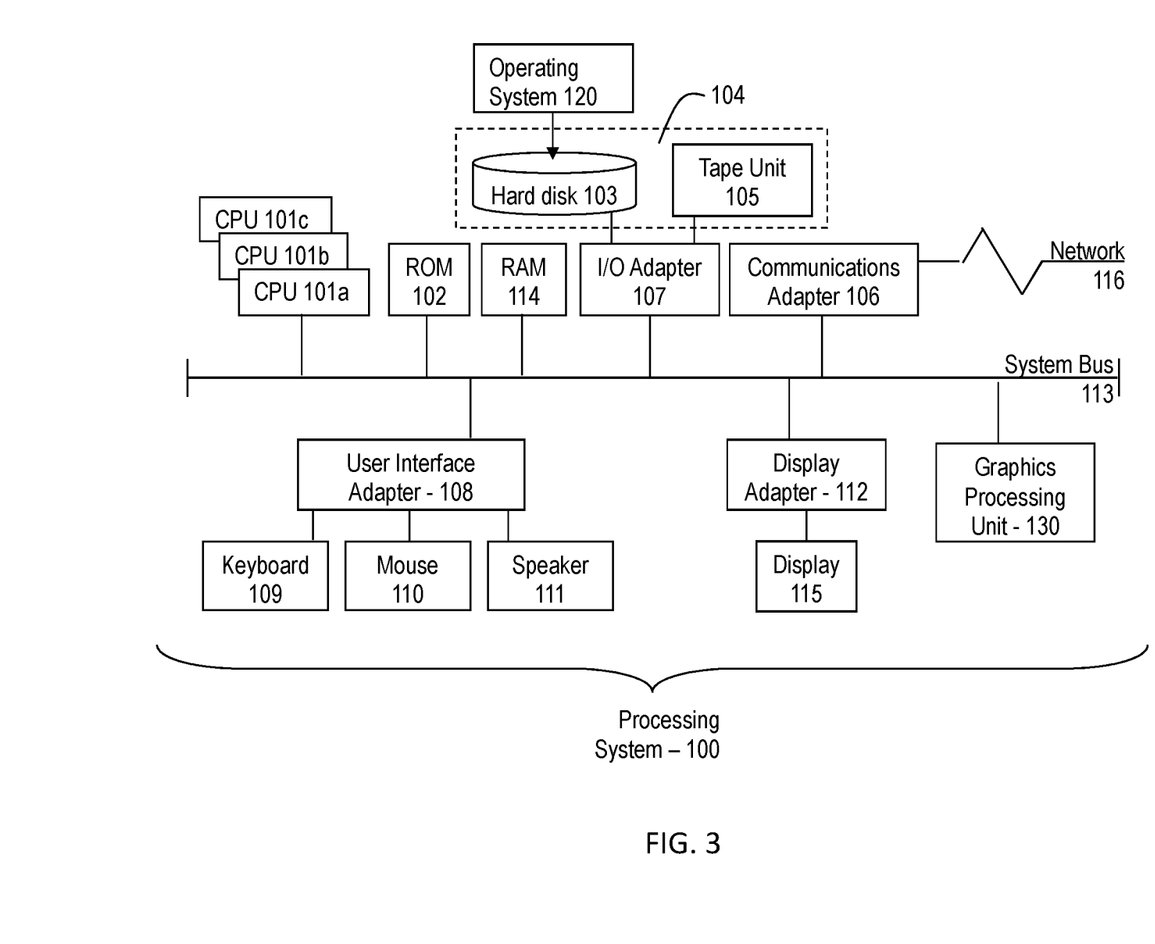
FIG. 3 is a block diagram illustrating one example of a processing system for practice of the teachings herein.

Referring to FIG. 3, there is shown an embodiment of a processing system 100 for implementing the teachings herein. In this embodiment, the system 100 has one or more central processing units (processors) 101a, 101b, 101c, etc. (collectively or generically referred to as processor(s) 101). In one embodiment, each processor 101 may include a reduced instruction set computer (RISC) microprocessor. Processors 101 are coupled to system memory 114 and various other components via a system bus 113. Read only memory (ROM) 102 is coupled to the system bus 113 and may include a basic input/output system (BIOS), which controls certain basic functions of system 100.

FIG. 3 further depicts an input/output (I/O) adapter 107 and a network adapter 106 coupled to the system bus 113. I/O adapter 107 may be a small computer system interface (SCSI) adapter that communicates with a hard disk 103 and/or tape storage drive 105 or any other similar component. I/O adapter 107, hard disk 103, and tape storage device 105 are collectively referred to herein as mass storage 104. Operating system 120 for execution on the processing system 100 may be stored in mass storage 104. A network adapter 106 interconnects bus 113 with an outside network 116 enabling data processing system 100 to communicate with other such systems. A screen (e.g., a display monitor) 115 is connected to system bus 113 by display adaptor 112, which may include a graphics adapter to improve the performance of graphics intensive applications and a video controller. In one embodiment, adapters 107, 106, and 112 may be connected to one or more I/O busses that are connected to system bus 113 via an intermediate bus bridge (not shown). Suitable I/O buses for connecting peripheral devices such as hard disk controllers, network adapters, and graphics adapters typically include common protocols, such as the Peripheral Component Interconnect (PCI). Additional input/output devices are shown as connected to system bus 113 via user interface adapter 108 and display adapter 112. A keyboard 109, mouse 110, and speaker 111 all interconnected to bus 113 via user interface adapter 108, which may include, for example, a Super I/O chip integrating multiple device adapters into a single integrated circuit.

In exemplary embodiments, the processing system 100 includes a graphics processing unit 130. Graphics processing unit 130 is a specialized electronic circuit designed to manipulate and alter memory to accelerate the creation of images in a frame buffer intended for output to a display. In general, graphics processing unit 130 is very efficient at manipulating computer graphics and image processing and has a highly parallel structure that makes it more effective than general-purpose CPUs for algorithms where processing of large blocks of data is done in parallel.

Thus, as configured in FIG. 3, the system 100 includes processing capability in the form of processors 101, storage capability including system memory 114 and mass storage 104, input means such as keyboard 109 and mouse 110, and output capability including speaker 111 and display 115. In one embodiment, a portion of system memory 114 and mass storage 104 collectively store an operating system to coordinate the functions of the various components shown in FIG. 3.

Figure 4:
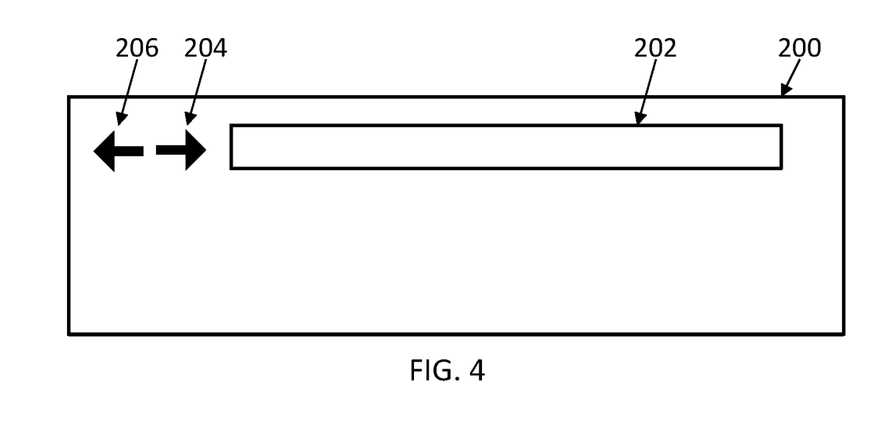
FIG. 4 is a schematic diagram illustrating a web browser in accordance with an exemplary embodiment.

Referring now to FIG. 4, a web browser 200 in accordance with an exemplary embodiment is illustrated. As illustrated, the web browser 200 includes an address bar 202, a forward icon 204 and a backward icon 206 that are used to navigate the Internet. The address bar 202 allows a user to enter an address of a desired webpage and the forward icon 204 is used to advance forward in a browsing history of the web browser. Likewise, the backward icon 206 is used to move backwards through the browsing history of the web browser. The browsing history of the web browser is a record of the webpages that have previously been viewed by the web browser.

In exemplary embodiments, the forward icon 204 and the backward icon 206 can be configured to allow a user to selectively navigate through the browsing history of the web browser at various levels of granularity by executing different actions with respect to the icons. In traditional web browsers, a web browser 200 is configured to move forward or backward in the browsing history by a single webpage by detecting a single left-click on the forward icon 204 or the backward icon 206, respectively.

As used herein, a webpage is a specific page that is part of a website. For example, a website may be www.wikipedia.org that is made up of various websites that have addresses that include the domain, www.wikipedia.org. In one embodiment, the web browser 200 is configured to move forward or backward in the browsing history to the next or last distinct website by detecting a double left-click on the forward icon 204 or the backward icon 206, respectively. In another embodiment, the web browser 200 is configured to move forward or backward in the browsing history to the next or last distinct website by detecting a single right-click on the forward icon 204 or the backward icon 206, respectively.

In exemplary embodiments, the web browser 200 is configured to allow a user to not only select to return to a previous webpage but also to allow a user to return to a previous website, a previous search page or to a previous web browsing session. In exemplary embodiments, these functions can be provided by separate graphical user interface icons, i.e., buttons, or these function can be provided by detecting specific user actions with existing graphical user interface icons.

Figure 5:
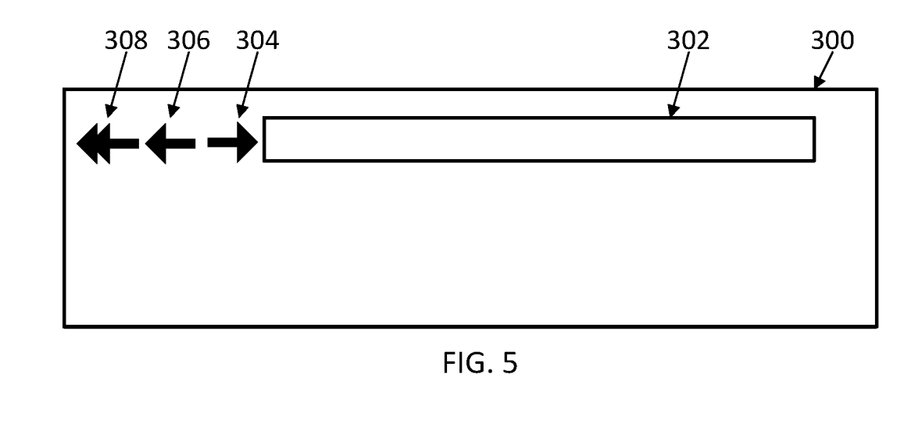
FIG. 5 is a schematic diagram illustrating a web browser in accordance with an exemplary embodiment.

Referring now to FIG. 5, a web browser 300 in accordance with an exemplary embodiment is illustrated. As illustrated, the web browser 300 includes an address bar 302, a forward icon 304, a back page icon 306 and a back site page icon 308 that are used to navigate the Internet. In exemplary embodiments, the first backward icon 306 is configured to cause the web browser 300 to navigate to a previous website in the browsing history of the web browser and the back site icon 308 is configured to cause the web browser 300 to navigate to a previous webpage in a browsing history of the web browser. In one example, a browsing history includes the following:

1. startpage.com "employee engagement"
2. en.wikpedia.org/wiki/Employee_engagement
3. en.wikpedia.org/wiki/Job_satisfaction
4. en.wikpedia.org/wiki/Edwin_A._Locke
5. engageforsuccess.org/about/what-is-employee-engagement/
6. engageforsuccess.org/about/who-is-involved
7. engageforsuccess.org/about/why-does-it-matter/8.
8. scholar.google.com "employee engagement"
9. factorhappiness.at/downloads/quellen/s17_harter.pdf
10. citeseerx.ist.psu.edu/viewdoc/download-?doi=10.1.1.182.2845& . . .
11. emeraldinsight.com/doi/abs/10.1108/02621710210426864
12. startpage.com "job engagement scale"
13. startpage.com "job engagement scale"
14. lib.sun.ac.za/Library/eng/finding/CP-DWell%282011%29/Rich.pdf
15. startpage.com "utrecht work engagement scale".

The forward icon 304 and the back page icon 306 are configured to advance/traverse the browsing history one webpage at a time. For example, if a user is currently viewing page 6 of the above browsing history, a click on the forward icon 304 will take the user to page 7 of the browsing history. Likewise, if a user is currently viewing page 6 of the above browsing history a click on the first backward icon 306 will take the user to page 5 of the browsing history. If a user is currently viewing page 6 of the above browsing history, a click on the back site icon 308 will take the user to page 4 of the browsing history, as it is the most recent website that has a domain that is different from the currently displayed website.

Figure 6:
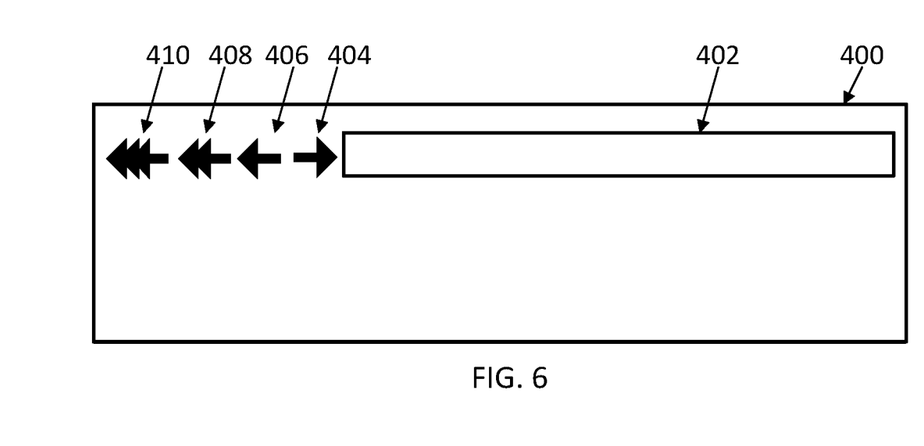
FIG. 6 is a schematic diagram illustrating a web browser in accordance with an exemplary embodiment.

Referring now to FIG. 6, a web browser 400 in accordance with an exemplary embodiment is illustrated. As illustrated, the web browser 400 includes an address bar 402, a forward icon 404, a back page icon 406, a back site icon 408 and a previous search icon 410 that are used to navigate the Internet. In exemplary embodiments, the back page icon 406 is configured to cause the web browser 400 to navigate to a previous website in the browsing history of the web browser and the back site icon 408 is configured to cause the web browser 400 to navigate to a previous webpage in a browsing history of the web browser. The previous search icon 410 is configured to cause the web browser 400 to navigate to the most recently viewed webpage that is associated with a search engine. For example, using the web browsing history shown above, if a user is currently viewing page 6 of the above browsing history, a click on the previous search icon 410 will take the user to page 1 of the browsing history.

Figure 7:
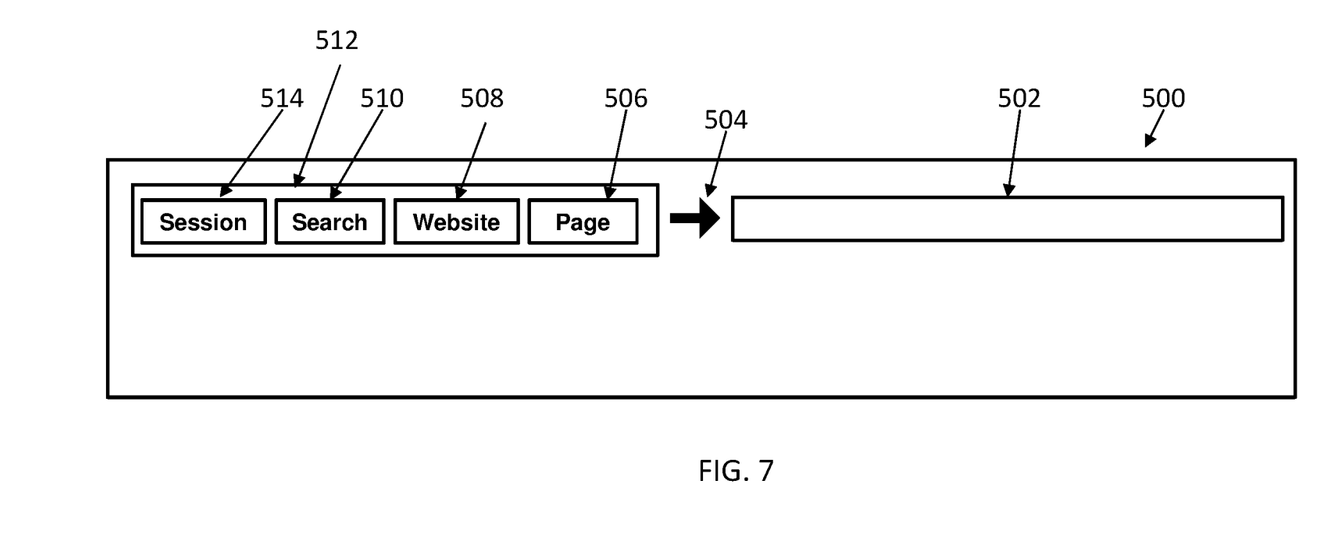
FIG. 7 is a schematic diagram illustrating a web browser in accordance with an exemplary embodiment.

Referring now to FIG. 7, a web browser 500 in accordance with an exemplary embodiment is illustrated. As illustrated, the web browser 500 includes an address bar 502, a forward icon 504 and a backward icon 512 that are used to navigate the Internet. In exemplary embodiments, the backward icon 512 may be a traditional backward icon that the user can optionally expand, for example by right-clicking on the backward icon 512, to present the user with a plurality of navigation options. The navigation options may include, but are not limited to, a back page icon 506, a back site icon 508, a previous search icon 510 and a previous session icon 514. In other embodiments, the web browser 500 may be configured to display the back page icon 506, the back site icon 508, the previous search icon 510 and the previous session icon 514 by default.

In exemplary embodiments, the previous session icon 514 is configured to cause the web browser 500 to navigate to the most recently viewed webpage that is associated with a previous web browsing session. For example, if a user browses the Internet via the web browser 500 and stops for a time period before resuming browsing, the previous session icon 514 can be used to quickly jump to the last website visited during the previous browsing session. In exemplary embodiments, the user can utilize the settings of the web browser to identify a time period of inactivity that will be associated with a session break.

In exemplary embodiments, a web browser may be configured to permit a user to specify that a new browsing session is beginning, which can be used either as an alternative to, or in combination with, the session-criterion of a time period of inactivity. In situations where a user is working on different projects that involve web browsing sessions, the user can use the web browser to save the browsing history for each project as different sessions. As a result, the user can quickly transition from one session to the next and have access to the relevant browsing history.

In one example, a user works on a first project using a web browser, completes that project and saves the web browsing session as session one. Upon completion of the first project, the user sends a deliverable to a client, based on that first session. The user then progresses onto working on a second project using the web browser and saves the web browsing session as session two. Upon completion of the second project, the user sends a second deliverable to a second client. The user then begins working on a third project. While working on the third project, the user receives a question from the client about the deliverable which requires the user to revisit the second project. The user can use the back session function of the web browser to quickly revert to session two and to revisit the webpages and websites the user viewed during his work on project one.

Although the above advanced navigational controls for the web browsers have been discussed above in terms of expanded backward navigational controls, it will be clear to those of ordinary skill in the art that such controls can also be used to navigate forward through a browsing history of a web browser. In addition, while specific navigational controls have been discussed, the present invention is not intended to be limited to such controls. Rather, the specific navigational controls are provided as examples.

Figure 8:
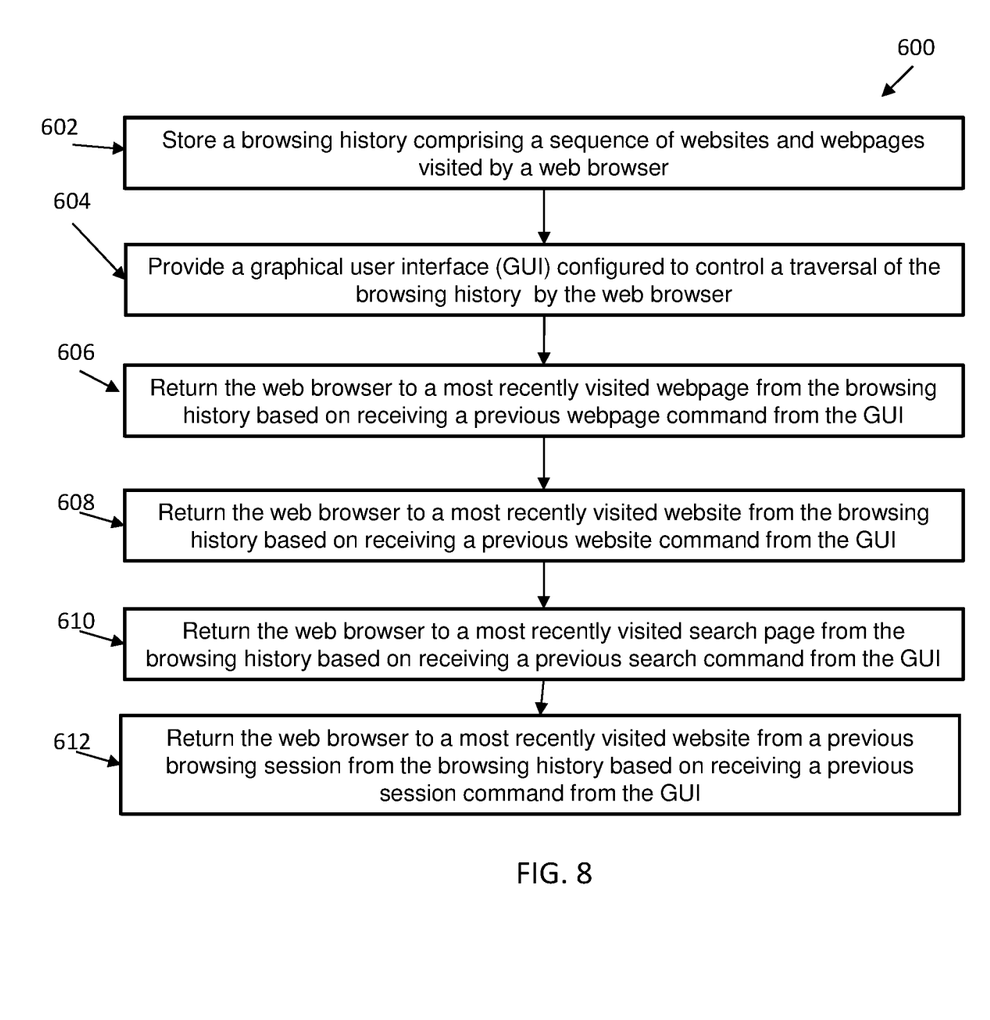
FIG. 8 is a flow diagram of a method for providing improved navigational functionality in a web browser in accordance with an exemplary embodiment.

Referring now to FIG. 8, a flow diagram of a method 600 for providing improved navigational functionality in a web browser in accordance with an exemplary embodiment is shown. As shown at block 602, the method 600 includes storing a browsing history comprising a sequence of websites and webpages visited by a web browser. Next, as shown at block 604, the method 600 includes providing a graphical user interface (GUI) configured to control a traversal of the browsing history by the web browser. The method 600 includes returning the web browser to a most recently visited webpage from the browsing history based on receiving a previous webpage command from the GUI, as shown at block 606. The method 600 also includes returning the web browser to a most recently visited website from the browsing history based on receiving a previous website command from the GUI, as shown at block 608. The most recently visited website is associated with a different domain name than a currently displayed webpage. In exemplary embodiments, the previous website command can be created by a user clicking on a previous website icon in the GUI or by a user double clicking on a previous webpage icon in the GUI.

Continuing with reference to FIG. 8, the method 600 includes returning the web browser to a most recently visited search page from the browsing history based on receiving a previous search command from the GUI, as shown at block 610. In exemplary embodiments, the previous search command can be created by a user clicking on a previous search icon in the GUI or by a right clicking on a previous webpage icon in the GUI. The method 600 includes returning the web browser to a most recently visited website from a previous browsing session from the browsing history based on receiving a previous session command from the GUI, as shown at block 612. In exemplary embodiments, the previous web browsing session in the browsing history is identified based on an elapsed time between two adjacent websites exceeding a threshold time period.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer implemented method for providing improved navigational functionality in a web browser, the computer implemented method comprises:
    storing a browsing history comprising a sequence of websites and webpages visited by the web browser, wherein a webpage is a specific page that is part of a website and each website comprises one or more webpages;
    providing a graphical user interface (GUI) configured to control a traversal of the browsing history by the web browser;
    determining a current position of the web browser within the browsing history, the current position identifying a current webpage of a current website; and
    based on receiving a previous website command from the GUI, identifying a domain of the current website and returning the web browser to a most recently visited website from the browsing history having a different domain than the current website.

2. The computer implemented method of claim 1, wherein the most recently visited website is associated with a different domain name than a currently displayed webpage.

3. The computer implemented method of claim 1, further comprising, based on receiving a previous search command from the GUI:
    identifying a next most recently visited search website from the current position of the web browser in the browsing history that is associated with a search engine domain; and
    returning the web browser to the next most recently visited search website.

4. The computer implemented method of claim 3, wherein the GUI includes a previous search icon that is configured to create the previous search command.

5. The computer implemented method of claim 1, further comprising, based on receiving a previous webpage command from the GUI, returning the web browser to a most recently visited webpage from the browsing history.

6. The computer implemented method of claim 5, wherein the GUI includes a previous website icon that is configured to create the previous website command.

7. The computer implemented method of claim 1, further comprising returning the web browser to a last website of a previous web browsing session in the browsing history based on receiving a previous session command from the GUI.

8. The computer implemented method of claim 7, wherein the previous web browsing session in the browsing history is identified based on one of an elapsed time between two adjacent websites exceeding a threshold time period and a user indication of a new browsing session.

9. The computer implemented method of claim 8, wherein the GUI includes a previous session icon that is configured to create the previous session command.

10. A computer program product for providing improved navigational functionality in a web browser, the computer program product comprising:
    a non-transitory storage medium readable by a processing circuit and storing instructions for execution by the processing circuit for performing a method comprising:
    storing a browsing history comprising a sequence of websites and webpages visited by the web browser, wherein a webpage is a specific page that is part of a website and each website comprises one or more webpages;
    providing a graphical user interface (GUI) configured to control a traversal of the browsing history by the web browser;
    determining a current position of the web browser within the browsing history, the current position identifying a current webpage of a current website; and
    based on receiving a previous website command from the GUI, identifying a domain of the current website and returning the web browser to a most recently visited website from the browsing history having a different domain than the current website.

11. The computer program product of claim 10, wherein the most recently visited website is associated with a different domain name than a currently displayed webpage.

12. The computer program product of claim 10, further comprising, based on receiving a previous search command from the GUI:
    identifying a next most recently visited search website from the current position of the web browser in the browsing history that is associated with a search engine domain; and
    returning the web browser to the next most recently visited search website.

13. The computer program product of claim 12, wherein the GUI includes a previous search icon that is configured to create the previous search command.

14. The computer program product of claim 10, further comprising, based on receiving a previous webpage command from the GUI, returning the web browser to a most recently visited webpage from the browsing history.

15. A computer device having improved web browsing functionality includes a processor in communication with one or more types of memory, the processor configured to:
    store a browsing history comprising a sequence of websites and webpages visited by a web browser, wherein a webpage is a specific page that is part of a website and each website comprises one or more webpages;
    provide a graphical user interface (GUI) configured to control a traversal of the browsing history by the web browser;
    determine a current position of the web browser within the browsing history, the current position identifying a current webpage of a current website; and
    based on receiving a previous website command from the GUI, identify a domain of the current website and return the web browser to a most recently visited website from the browsing history having a different domain than the current website.

16. The computer device of claim 15, wherein the most recently visited website is associated with a different domain name than a currently displayed webpage.

17. The computer device of claim 15, further comprising, based on receiving a previous search command from the GUI:

identifying a next most recently visited search website from the current position of the web browser in the browsing history that is associated with a search engine domain; and returning the web browser to the next most recently visited search website.

18. The computer device of claim 15, wherein the GUI includes a previous search icon that is configured to create the previous search command.

19. The computer device of claim 15, further comprising, based on receiving a previous webpage command from the GUI, returning the web browser to a most recently visited webpage from the browsing history.

20. The computer device of claim 15, further comprising returning the web browser to a last website of a previous web browsing session in the browsing history based on receiving a previous session command from the GUI.

* * * * *